US010118674B1

(12) United States Patent
Jeffrey et al.

(10) Patent No.: US 10,118,674 B1
(45) Date of Patent: Nov. 6, 2018

(54) CARGO LASHING FITTING

(71) Applicant: Peck & Hale, L.L.C., West Sayville, NY (US)

(72) Inventors: Scott Jeffrey, Bellport, NY (US); Richard Belkin, Bay Shore, NY (US)

(73) Assignee: Peck & Hale, L.L.C., West Sayville, NY (US)

(*) Notice: Subject to any disclaimer, the term of this patent is extended or adjusted under 35 U.S.C. 154(b) by 0 days.

(21) Appl. No.: 15/455,345

(22) Filed: Mar. 10, 2017

Related U.S. Application Data

(60) Provisional application No. 62/306,140, filed on Mar. 10, 2016.

(51) Int. Cl.
*B63B 25/24* (2006.01)
*B60P 7/08* (2006.01)

(52) U.S. Cl.
CPC .......... *B63B 25/24* (2013.01); *B60P 7/0807* (2013.01); *B60P 7/0823* (2013.01)

(58) Field of Classification Search
CPC .............................. B63B 25/24; B60P 7/0807
USPC ....................................................... 410/112
See application file for complete search history.

(56) References Cited

U.S. PATENT DOCUMENTS

| | | | |
|---|---|---|---|
| 2,284,847 A * | 6/1942 | Raymond | G03B 17/12 359/827 |
| 2,843,060 A | 7/1958 | Sladek | |
| 2,952,946 A | 9/1960 | Lucas | |
| 2,962,245 A | 11/1960 | Molzan | |
| 3,233,319 A | 2/1966 | Jensen | |
| 3,556,457 A | 1/1971 | Patnaude | |
| 3,647,172 A | 3/1972 | van der Molen | |
| 3,776,169 A | 12/1973 | Strecker | |
| 3,860,209 A | 1/1975 | Strecker | |
| 3,888,190 A | 6/1975 | Bigge | |
| 3,927,623 A | 12/1975 | Caron | |
| 3,973,684 A | 8/1976 | Di Martino | |
| 4,091,744 A | 5/1978 | Crissy et al. | |
| 4,096,816 A | 6/1978 | Patterson, III | |
| 4,400,856 A | 8/1983 | Tseung | |
| 4,457,650 A | 7/1984 | Tseung | |
| 4,645,392 A | 2/1987 | Takaguchi | |
| 4,877,361 A | 10/1989 | DeRosa et al. | |
| 5,823,588 A | 10/1998 | Morghen | |
| 6,422,795 B2 | 7/2002 | Holt et al. | |
| 8,197,166 B2 | 6/2012 | Stull et al. | |
| 8,360,385 B2 | 1/2013 | Burg et al. | |
| 8,505,868 B2 | 8/2013 | Silvio et al. | |
| 8,517,327 B2 * | 8/2013 | Kaiser | B65C 9/065 248/346.01 |

(Continued)

FOREIGN PATENT DOCUMENTS

WO     WO-2011090430 A1 *   7/2011   ............ B60P 7/0807

OTHER PUBLICATIONS

Pacific Marine & Industrial, Helicopter Tie Down Web Pages, Jun. 3, 2010.

*Primary Examiner* — Hilary L Gutman
(74) *Attorney, Agent, or Firm* — Schroeder Law PC

(57) ABSTRACT

A socket assembly including a housing, a base and a locking ring. The housing includes a recessed interior capable of receiving and securing the base. The locking ring cooperates with the housing and the base to secure the base against rotation. The base preferably includes a lashing fixture (e.g., cloverleaf, crossbar, or other) for engaging with a lashing hook.

14 Claims, 8 Drawing Sheets

(56) References Cited

U.S. PATENT DOCUMENTS

| | | | |
|---|---|---|---|
| 8,568,070 B2 | 10/2013 | Meszaros | |
| 8,814,125 B2 | 8/2014 | Silvio et al. | |
| 9,340,142 B1 * | 5/2016 | Belkin | B60P 7/06 |
| 9,756,930 B2 * | 9/2017 | Hanchett | A45F 5/02 |
| 2011/0210227 A1 * | 9/2011 | Burg | B60P 7/0807 |
| | | | 248/499 |
| 2012/0107067 A1 * | 5/2012 | Meszaros | B60P 7/0807 |
| | | | 410/101 |

* cited by examiner

CARGO LASHING FITTING

This application claims the benefit of U.S. Provisional Application Ser. No. 62/306,140, filed Mar. 10, 2016.

BACKGROUND OF THE INVENTION

The present invention relates to maritime transportation of cargo and, more particularly, to a cargo lashing fitting affixed to the deck of a vessel for the securing of cargo.

Transportation of cargo requires securing systems which include devices that ensure that such cargo remains safely stowed and stationary during transit. In this regard, the deck(s) of the transportation vehicles, e.g., ship, railcar, etc., typically include a plurality of cargo lashing fittings, often referred to as sockets or socket assemblies.

The maritime transportation of cargo requires securing systems which include devices that can support and transfer the very high loads experienced as a result of the ship's dynamics and environmental conditions. These high loads often dictate that the socket assembly fixture affixed to the vessel be made of properly designed and treated steel.

As ships are being designed to be lighter, faster and more economical, aluminum alloy structure is becoming more common, including for large commercial and military vessels. This usage of aluminum alloy for the deck increases the difficulty of designing and installing a socket that will handle and properly transfer loads to the ship's structure. First, the socket must be compatible with the aluminum alloy deck of the ship. Second, aluminum alloy is susceptible to galling from the hook of the lashing gear, thereby resulting in wear of the lashing fixture of the socket.

In addition, prior art sockets are typically installed as an integrated unit. This means that if the lashing fixture is damaged and/or worn, the entire socket must be "cut" out of the deck of the ship. This is, of course, a time consuming, intricate, and costly procedure. There may also be applications where the preferred lashing fixture (e.g., cloverleaf vs. crossbar vs. other) varies depending on the nature of the application.

Attempts have been made to provide a socket having a removable/replaceable lashing fixture. However, these prior art sockets typically require a plurality of fasteners that must be removed for extraction. In addition, these prior art sockets require fastener removal/installation tools and extended time to complete the removal/replacement.

There is therefore a need in the art for a socket which is adapted for installation in an aluminum deck of a vessel, and which provides a lashing fixture which may be removed/replaced without flame cutting of the entire socket from the aluminum deck. There is a further need in the art for a socket which provides a lashing fixture which may be removed/replaced in a shortened time period and without the use of tools.

SUMMARY OF THE INVENTION

The present invention, which addresses the needs of the prior art, relates to a socket assembly including a housing, a base and a locking ring. The housing includes a recessed interior capable of receiving and securing the base therein. The locking ring cooperates with the housing and the base to secures the base against rotation. The base preferably includes a lashing fixture (e.g., cloverleaf, crossbar, or other) for engaging with a lashing hook. These components are preferably made of aluminum alloys, or other compatible material suitable for use with an aluminum and/or aluminum alloy deck.

The aluminum alloy housing is permanently installed into pre-configured pockets on the deck of a vessel. The housing can be installed by welding to the deck structure of the vessel. The base is secured into the housing in a non-welded manner, and manually positioned to create a positive interference lock. The load applied to the base during usage is transferred through the housing and into the deck of the vessel.

The base can be formed with any suitable lashing fixture, including the common cloverleaf and crossbar patterns. Due to the ease of removal/installation, the base can be readily replaced when necessary (e.g., due to wear or galling of the lashing fixture) or when desired (e.g., a particular lashing fitting is required for a particular application).

In one preferred embodiment, the present invention provides a cargo lashing fitting for affixing to a deck of a transportation vessel. The deck includes an opening therein. The fitting is configured to cooperate with an engagement component of a lashing gear assembly. The fitting includes a housing sized for insertion within the opening of the deck. The housing is secured to the deck. The housing includes a plurality of shelves extending radially inwardly from the interior surface thereof, each of the shelves defining an upper shoulder, a lower wall, and a pair of opposing side edges. The fitting further includes an insert assembly. The insert assembly includes a base having a generally circular body and an engagement plate located at its upper end. The base further includes a plurality of flanges extending radially outwardly from the body near the upper end thereof. The flanges are sized and configured to cooperate with the shoulders of the housing when the base is installed in the housing. The base further includes a plurality of blocks extending radially outwardly from the body, the blocks being located at the lower end of the base and being sized and configured to cooperate with the lower walls of the shelves when the base is installed in the housing. The insert assembly further includes a locking ring having a circular frame defining the upper end thereof, the frame having a plurality of tabs extending downwardly therefrom. The locking ring is telescopically coupled to the base such that the locking ring can be moved from a first telescoped position wherein the lower edges of the tabs are substantially aligned with the flanges of the base and a second collapsed position wherein at least a portion of the circular frame substantially contacts the upper surfaces of the flanges of the base. The insert assembly is sized for insertion into the housing when the locking ring is in the telescoped position, the insert assembly being further sized for rotation within the housing such that the blocks of the base engage the bottom surfaces of the shelves of the housing. Finally, the tabs of said locking ring are sized for receipt between the shelves of the housing when the insert assembly is rotated within the housing and the locking ring is moved to the collapsed position thereby locking the insert assembly against rotation with respect to the housing.

As a result, the present invention provides a socket which is adapted for installation in an aluminum deck of a vessel, and which includes a lashing fixture which may be removed/replaced without flame cutting of the entire socket from the aluminum deck. The present invention further provides a socket having a lashing fixture which may be removed/replaced in a shortened time period and without the use of tools.

DETAILED DESCRIPTION OF THE INVENTION

Figure 1:
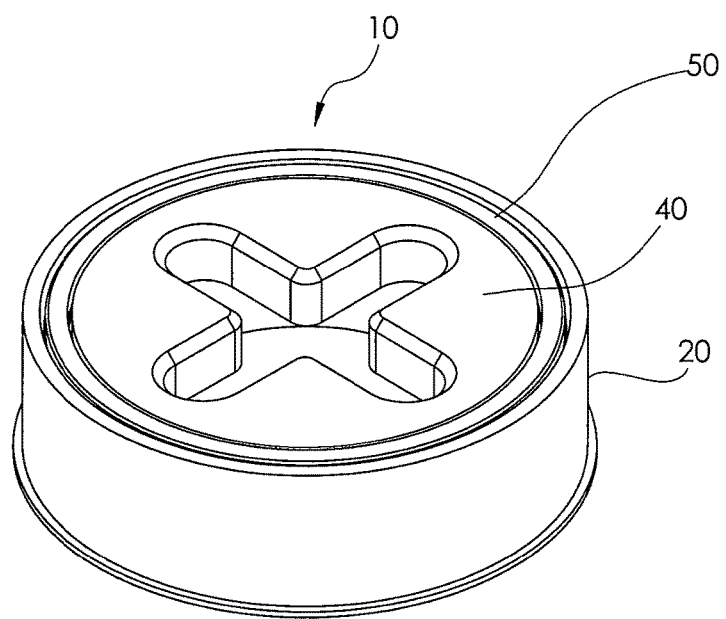
FIG. 1 is a top perspective view of a cloverleaf socket assembly according to the present invention.
Figure 2:
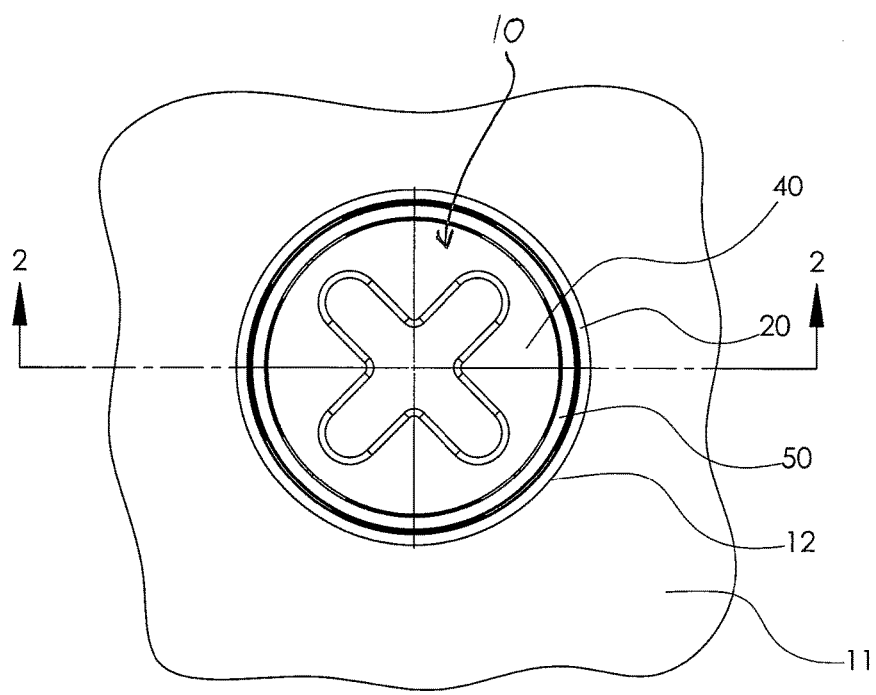
FIG. 2 is a top view showing the socket assembly of FIG. 1 installed within the deck of a vessel.
Figure 2A:
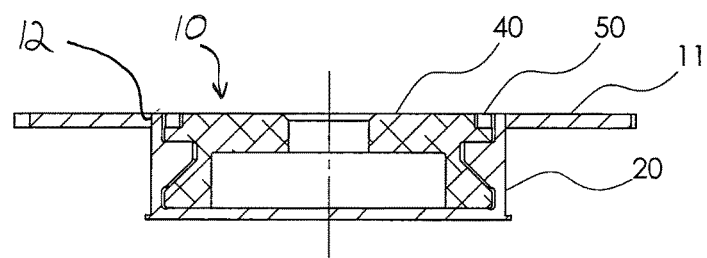
FIG. 2A is a sectional view taken along lines 2-2 of FIG. 2.

Referring to FIGS. 1, 2 and 2A, the present invention provides a cloverleaf-style socket assembly 10 for installation within a deck 11 of a vessel, e.g., a commercial ship, a military ship, etc. As explained further hereinbelow, socket assembly 10 is particularly suited for installation within a deck formed of aluminum or aluminum alloy and/or having a honeycomb construction. Deck 11 is provided with a cylindrical opening 12 sized to accommodate socket assembly 10. Cylindrical opening 12 is preferably provided during the manufacture of deck 11, and typically prior to installation of the deck within the vessel.

As best seen in FIGS. 1, 2, 2A and 3, socket assembly 10 includes a housing 20. The housing is preferably formed of aluminum or aluminum alloy, which provides compatibility with the material used to form deck 11. In one preferred embodiment, both housing 20 and deck 11 are formed of aluminum alloy. In addition to reducing the weight of housing 20, the usage of aluminum or an aluminum alloy allows housing 20 to be directly welded to the deck prior to the installation of the deck within the vessel.

Figure 3:
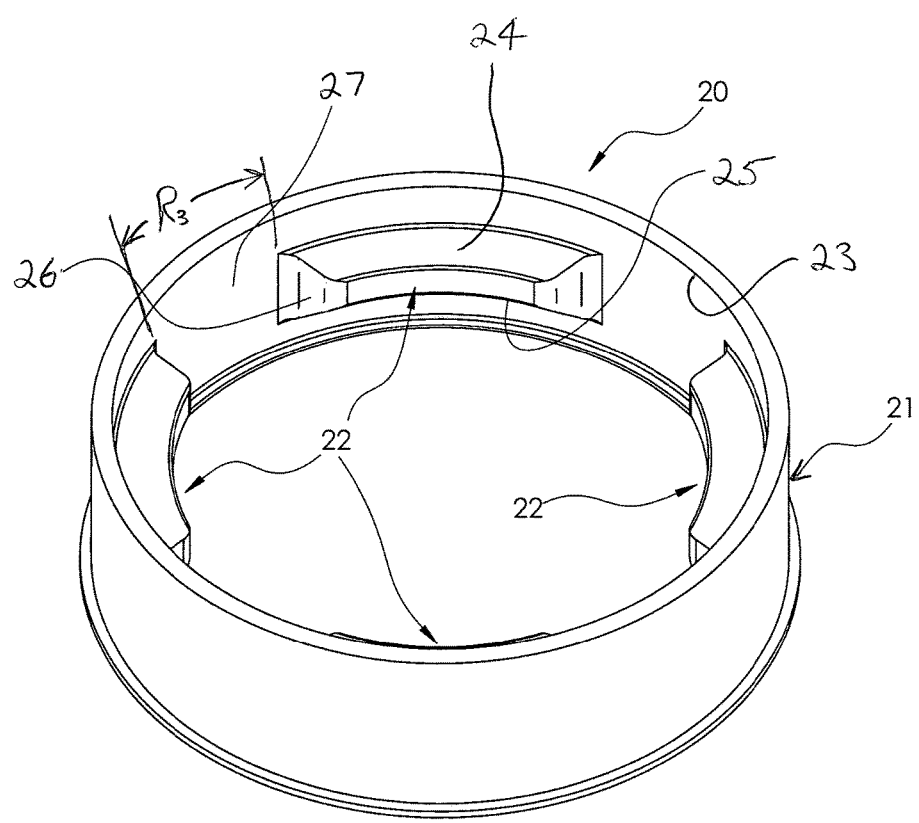
FIG. 3 is a top perspective view of a housing which forms part of the socket assembly of FIG. 1.

Referring to FIG. 3, housing 20 includes a cylindrically-shaped cup 21 having a plurality of shelves 22 extending radially inwardly from interior surface 23, the shelves 22 being symmetrically spaced thereabout. Each shelf 22 includes an upper horizontally-extending shoulder 24, a lower angularly-extending wall 25 (best seen in FIG. 5A) which extends to the interior surface 23 of the housing, and side edges 26. A notch 27 is defined between adjacent shelves 22.

Figure 6:
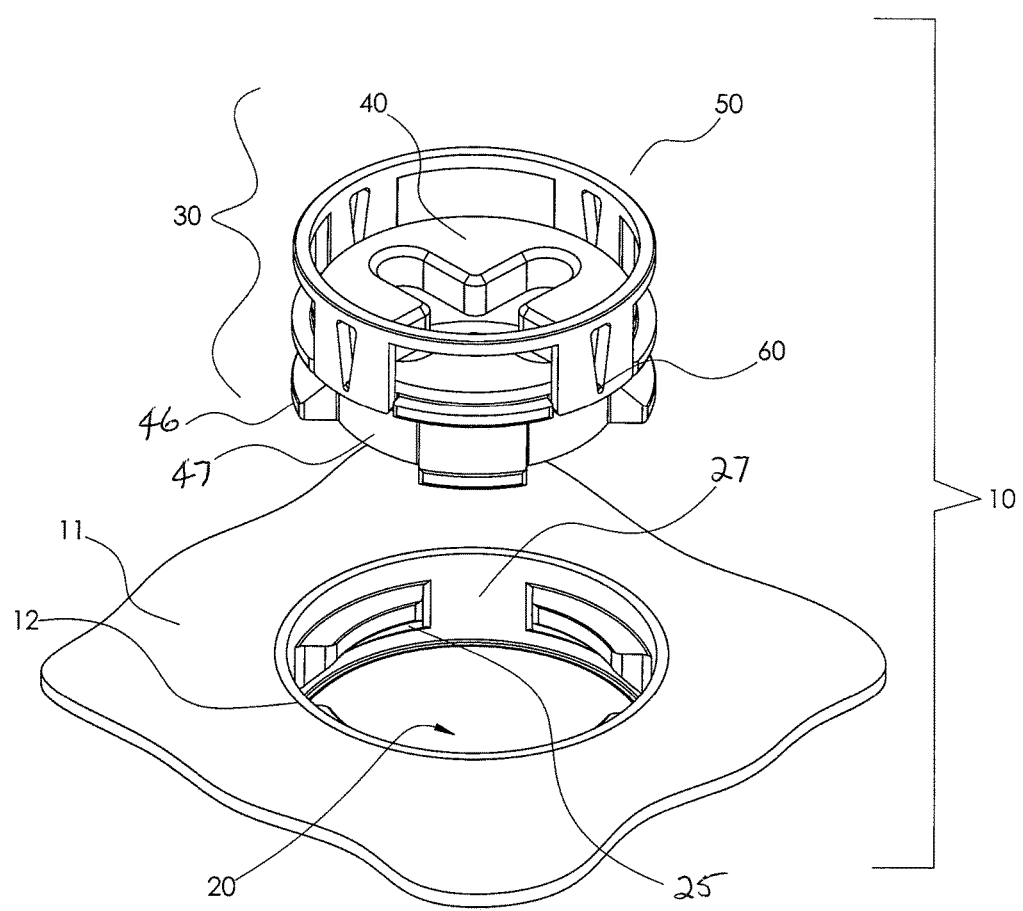
FIG. 6 is a top perspective view of the socket assembly of FIG. 1 showing an insert assembly formed of the base and locking ring positioned above the housing installed in the deck of the vessel.

Referring to FIG. 6, housing 20 is inserted into opening 12, aligned in a prescribed orientation, and thereafter welded to deck 11. It will be recognized that the ability to reduce welding in the field saves time and expense during the construction process, and also results in a more uniform and controlled installation of the housing 20 within the deck.

Socket assembly 10 further includes an insert assembly 30 which can be installed/uninstalled without welding and/or the disruption to the structure of deck 11. Insert assembly 30 includes a base 40 and locking ring 50. As best seen in FIG. 6, base 40 and locking ring 50 are telescopically coupled together via a plurality of fasteners, i.e., pins 60, which are received within apertures 61 (see FIG. 4A) of locking ring 50. As such, locking ring 50 can be moved from a first telescoped position as shown in FIGS. 5 and 6 to a second collapsed position as shown in FIGS. 1, 2, 2A, 5A, 7, 8 and 8A.

Figure 4:
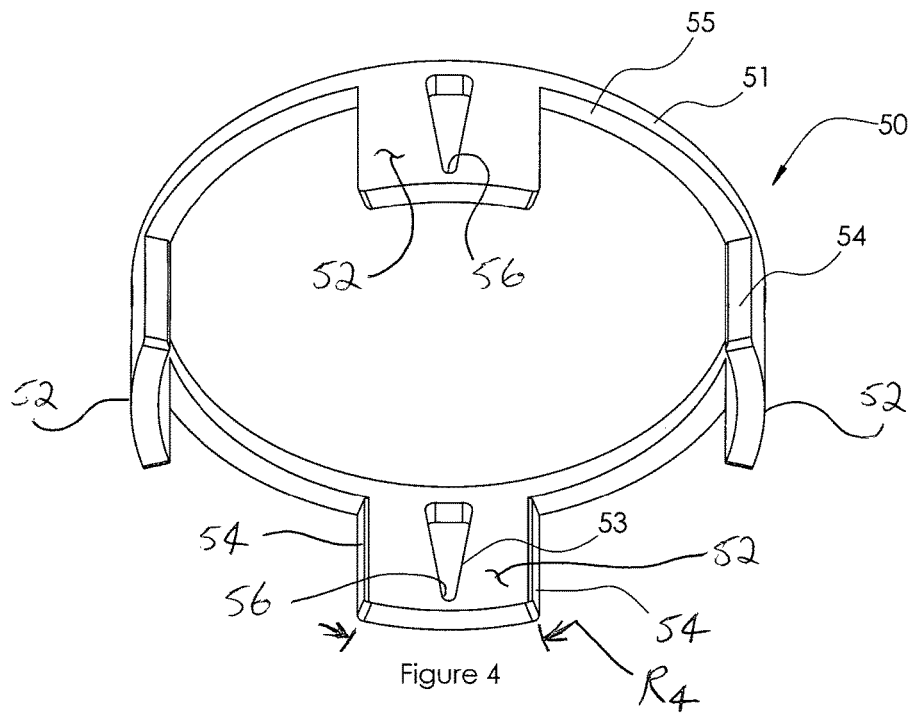
FIG. 4 is a bottom perspective view of a locking ring which forms part of the socket assembly of FIG. 1.
Figure 4A:
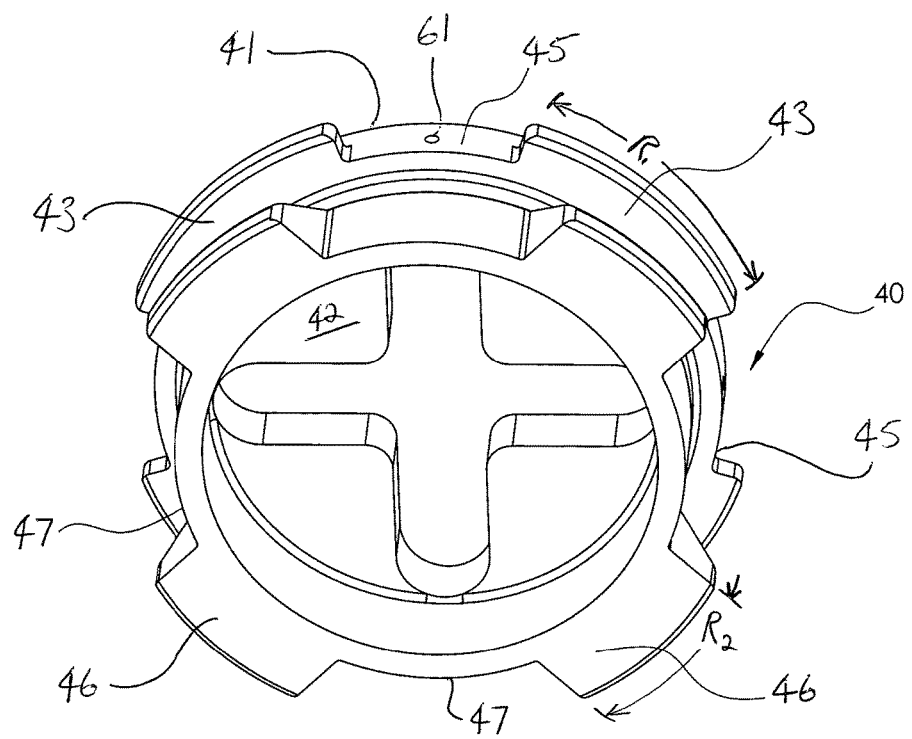
FIG. 4A is a bottom perspective view of a base which forms part of the socket assembly of FIG. 1.
Figure 5:
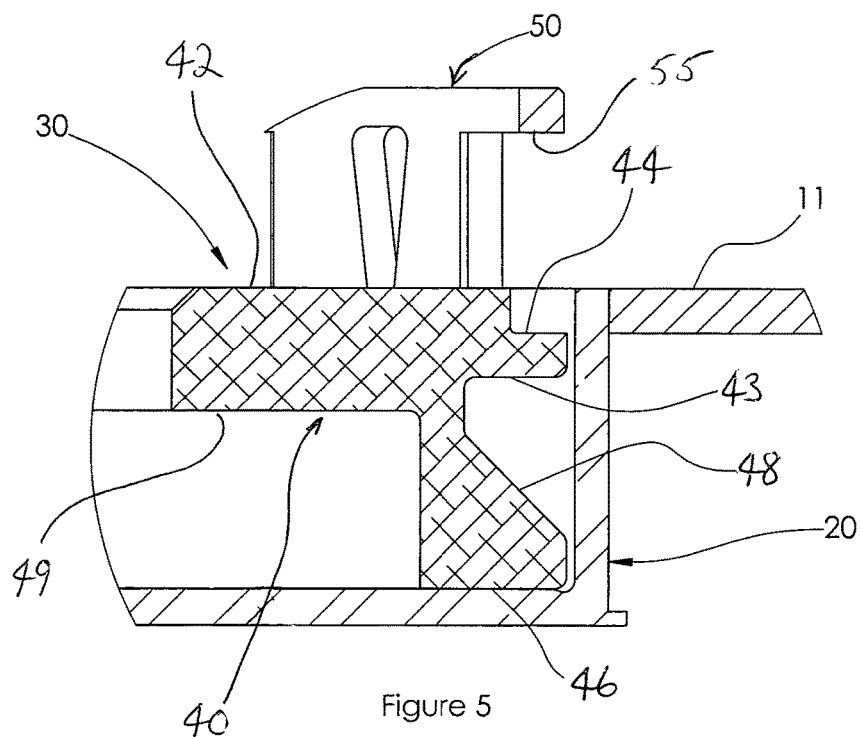
FIG. 5 is a detailed cross-section of the socket assembly of FIG. 1 prior to locking.
Figure 5A:
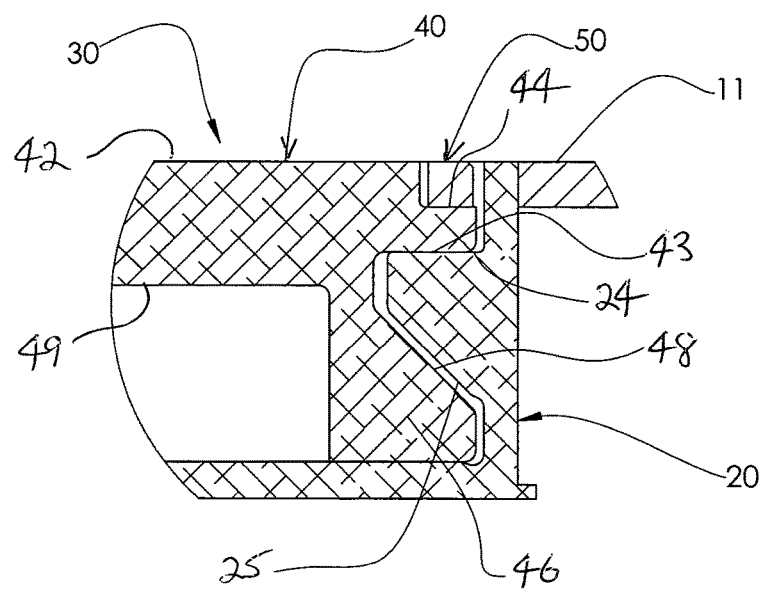
FIG. 5A is a detailed cross-section of the socket assembly of FIG. 1 shown in the locked position.

As shown in FIGS. 4A, 5 & 5A, base 40 includes a generally circular body 41 having an engagement plate 42 located at its upper end, which together define an inverted generally cylindrically-shaped cup. In one preferred embodiment, plate 42 includes a cloverleaf-shaped opening for receipt and engagement with the hook of a lashing gear assembly. In other embodiments, plate 42 could include a cross-bar or other type of lashing configuration. A plurality of flanges 43 extend radially outwardly from the exterior surface of body 41 near the upper end thereof, the flanges being sized and configured to cooperate with shoulders 24 of housing 20 (see FIG. 5A). Each of flanges 43 defines an upper surface 44. A notch 45 is defined between adjacent flanges 43. Base 40 further includes a plurality of blocks 46 extending radially outwardly from the exterior surface of body 41. A plurality of equally-spaced notches 47 are defined therebetween. Each of blocks 46 defines an inclined surface 48. Finally, plate 42 defines an engagement surface 49.

As best seen in FIG. 4, locking ring 50 includes a circular frame 51 having a plurality of tabs 52 extending downwardly therefrom. In one preferred embodiment, each of tabs 52 includes an inverted generally triangular-shaped opening 53 sized to accept pin 60. The triangular-shaped opening 53 allows the locking ring to be moved in a predefined manner with respect to base 40. Each of tabs 52 defines a set of opposing side edges 54. Frame 51 defines a lower surface 55. Finally, each of triangular-shaped opening 53 defines an apex 56.

Referring to FIGS. 4, 4A, 5A & 6, installation of insert assembly 30 into housing 20 requires blocks 46 of base 40 to be aligned with notches 27 of housing 20 thus permitting insert assembly 30 to be installed until flanges 43 of ring 40 contacts shoulders 24 of housing 20. In this position, the insert assembly 30 can be rotated clockwise or counter-clockwise (preferably 45 degrees) resulting in flanges 43 being centered on shoulder 24. This same position also aligns tabs 52 of locking ring 50 with notches 27 of housing 20 whereby the locking ring can be collapsed within the housing. Installation is complete when surface 55 of locking ring 50 contacts surface 44 of base 40. At this point, socket assembly 10 is available for use in securing cargo.

Figure 8:
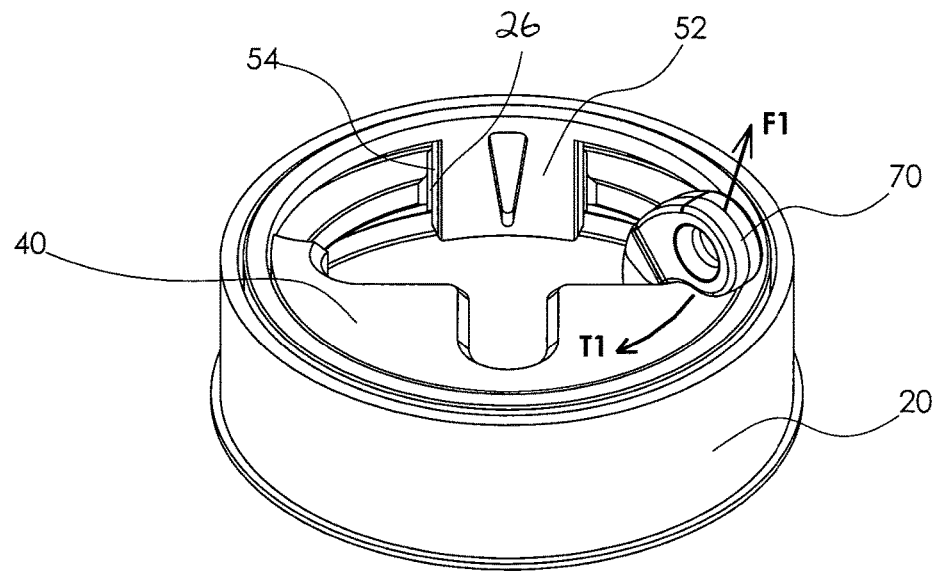
FIG. 8 is a top perspective cutaway view illustrating a combination of the torsional and tension forces acting on the socket assembly of FIG. 1.
Figure 8A:
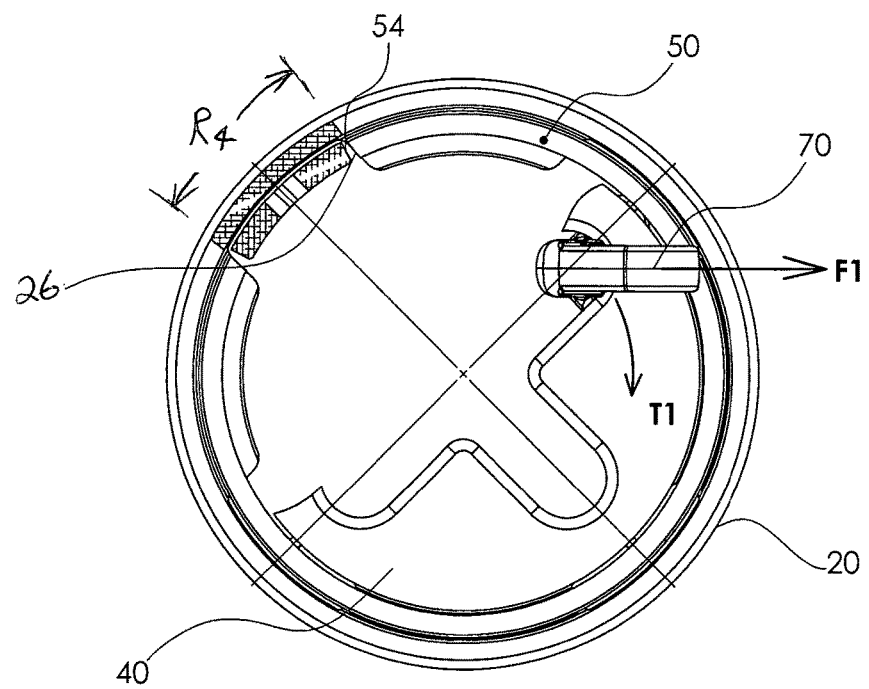
FIG. 8A is a plan view of FIG. 8.

As best seen in FIG. 4A, each of flanges 43 defines a radial arc $R_1$, while each of blocks 46 defines a radial arc $R_2$. In one preferred embodiment, radial arc $R_1$ is greater than radial arc $R_2$. As best seen in FIG. 3, a radial arc $R_3$ is defined between each of shelves 22 of housing 20. In one preferred embodiment, radial arc $R_3$ is greater than or substantially equal to radial arc $R_2$. As best seen in FIG. 8A, each of tabs 52 defines a radial arc $R_4$. In one preferred embodiment, radial arc $R_4$ is substantially equal to radial arc $R_3$.

Thus, insert assembly 30 of the present invention can be readily installed/removed from the deck of a vessel without the need for any tools or the removal/installation of hardware. It will be appreciated that frame 51 of locking ring 50 functions as a handle when installing/removing the insert assembly 30. It will be further appreciated that insert assembly 30 can be replaced in the event that the cloverleaf-shaped lashing fixture of base 40 experiences any galling or wear, or in the event that another lashing configuration (e.g., cross-bar) is necessary/desired for a particular application.

Figure 7:
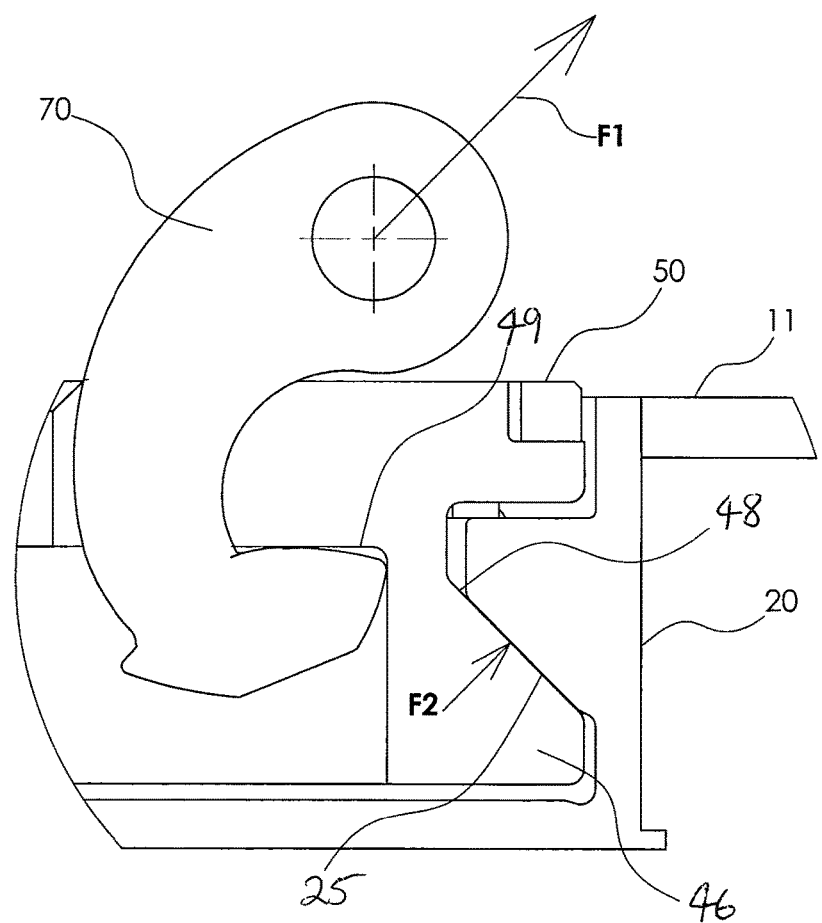
FIG. 7 is a sectional view illustrating the transfer of force through the socket assembly of FIG. 1.

Referring to FIG. 7, the inventive design of the present invention provides a load transfer technique which allows the usage of aluminum components, while also allowing for the assembly/disassembly of the socket assembly. More particularly, when a hook 70 of a lashing gear assembly engages surface 49, the tensioned lashing gear assembly will produce a pull force F1 as shown. Force F1, in turn, produces a compression load F2 which presses surface 48 of block 46 against wall 24 of housing 20, which is then transferred into the deck structure.

Many lashing gear installations can produce a combination of lateral or torsional forces on the base. To prevent the base from unintentional rotation, locking ring 50 includes a plurality of tabs 52 which define side edges 54. Referring to FIGS. 8 and 8A, when the locking ring is in the locked position, contact between side edges 54 of tabs 52 and side edges 26 of shelf 22 prevents unintentional rotation due to torsional force T1.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A cargo lashing fitting for affixing to a deck of a transportation vessel, said deck including an opening therein, said fitting configured to cooperate with an engagement component of a lashing gear assembly, said fitting comprising:
   a housing sized for insertion within said opening of said deck, said housing being secured to said deck, said housing defining an interior surface and including a plurality of shelves extending radially inwardly from said interior surface, each of said shelves defining an upper shoulder, a lower wall, and a pair of opposing side edges;
   an insert assembly, said insert assembly including:
      a base having a generally circular body defining an upper end, a lower end, and an exterior surface, said base further including an engagement plate located at said upper end, said base further including a plurality of flanges extending radially outwardly from said body near said upper end, said flanges being sized and configured to cooperate with said shoulders of said housing when said base is installed in said housing, each of said flanges defining an upper surface and a lower edge, said base further including a plurality of blocks extending radially outwardly from said body, said blocks being located at said lower end of said base and being sized and configured to cooperate with said lower walls of said shelves when said base is installed in said housing;
      a locking ring having a circular frame, said frame having a plurality of tabs extending downwardly therefrom, each of said tabs defining a lower edge;
   said locking ring being telescopically coupled to said base such that said locking ring can be moved from a first telescoped position wherein said lower edges of said tabs are substantially aligned with said lower edges of said flanges of said base and a second collapsed position wherein at least a portion of said circular frame substantially contacts said upper surfaces of said flanges of said base;
   said insert assembly being sized for insertion into said housing when said locking ring is in the telescoped position, said insert assembly being further sized for rotation within said housing such that said blocks of said base engage said lower walls of said shelves of said housing; and
   wherein said tabs of said locking ring are sized for receipt between said shelves of said housing when said insert assembly is rotated within said housing and said locking ring is moved to said collapsed position thereby locking said insert assembly against rotation with respect to said housing.

2. The cargo lashing fitting according to claim 1, wherein said housing is formed of aluminum.

3. The cargo lashing fitting according to claim 1, wherein said housing is a cylindrically-shaped cup.

4. The cargo lashing fitting according to claim 1, wherein each of said tabs in said locking ring includes an inverted substantially triangular-shaped opening, each of said openings defining an apex, and wherein said base includes a plurality of pin-receiving apertures circumferentially aligned with said triangular-shaped openings; and
   further comprising a plurality of pins for coupling said locking ring to said base.

5. The cargo lashing fitting according to claim 4, wherein said pins extend through said triangular-shaped opening and into said pin-receiving apertures of said base.

6. The cargo lashing fitting according to claim 5, wherein said pin is located in said apex of said triangular-shaped opening when said insert assembly is in said first telescoped position.

7. The cargo lashing fitting according to claim 1, wherein said base includes a cloverleaf lashing fixture.

8. The cargo lashing fitting according to claim 1, wherein said insert assembly is configured to be rotated approximately 45 degrees upon insertion into said housing.

9. The cargo lashing fitting according to claim 1, wherein said shelves are symmetrically spaced about said interior surface of said housing, and wherein said flanges and said blocks are symmetrically spaced about said exterior surface of said base.

10. The cargo lashing fitting according to claim 9, wherein said shelves are spaced at 45 degree increments about said interior surface of said housing, and wherein said flanges and said blocks are spaced at 45 degree increments about said exterior surface of said base.

11. The cargo lashing fitting according to claim 10, wherein said flanges and said blocks are angularly aligned about said exterior surface of said base.

12. The cargo lashing fitting according to claim 11, wherein each of said flanges defines a radial arc $R_1$, and wherein each of said blocks defines a radial arc $R_2$, and wherein $R_1$ is greater than $R_2$.

13. The cargo fitting according to claim 12, wherein said shelves define a plurality of notches extending therebetween, and wherein each of said notches defines a radial arc $R_3$, and wherein $R_3$ is greater than or substantially equal to $R_2$.

14. The cargo fitting according to claim 13, wherein each of said tabs defines a radial arc $R_4$, and wherein $R_4$ is substantially equal to $R_3$.

* * * * *